United States Patent [19]

Ceperley

[11] 4,114,380
[45] Sep. 19, 1978

[54] TRAVELING WAVE HEAT ENGINE

[76] Inventor: Peter Hutson Ceperley, 4803 Clemons Ct., Annandale, Va. 22003

[21] Appl. No.: 774,063

[22] Filed: Mar. 3, 1977

[51] Int. Cl.$^2$ .............................................. F03G 7/00
[52] U.S. Cl. ................................... 60/721; 62/467 R
[58] Field of Search ................. 60/516, 530, 643, 650, 60/682, 721; 116/DIG. 22; 62/6, 118, 467

[56] References Cited

U.S. PATENT DOCUMENTS 3,339,635  9/1967  Brandon ................................ 62/467

*Primary Examiner*—Allen M. Ostrager
*Assistant Examiner*—Stephen F. Husar

[57] ABSTRACT

A traveling wave heat engine can be used both as a heat engine and a heat pump. When it operates as an engine, thermal energy is converted into acoustical traveling waves from an acoustical wave source, which if desired, can be further converted into more conventional forms of electrical and mechanical power. When it operates as a heat pump, acoustical traveling waves supply the motivating force to pump heat. An object such as a flame holding screen, heat exchanger, or regenerator creates a stationary temperature gradient in the compressible working fluid of the engine. As acoustical traveling waves pass through this temperature gradient, they cause the fluid there to move through the gradient and back and so be heated or cooled in conjunction with the compression and expansion phases of the wave. The pressure and velocity components of an acoustical traveling wave are inherently phased properly to cause the fluid in the stationary temperature gradient to undergo a Stirling thermodynamic cycle that results in amplification or attenuation of the wave, depending on the wave direction relative to the direction of the gradient. This cycle also pumps heat in the direction opposite the direction of wave propogation through the device.

7 Claims, 7 Drawing Figures

TRAVELING WAVE HEAT ENGINE

BACKGROUND OF THE INVENTION

This invention relates to a heat engine which uses acoustical traveling waves to cause expansion and contraction of a unit mass of motivating fluid.

It is well known that acoustical standing waves of considerable amplitude can be set up in a gas column by the application of heat at a suitable fixed point. The transformation of heat into acoustical standing waves is accomplished by the action of these standing waves in compressing, expanding, and moving the gas similar to that which is done in a more conventional heat engine by the pistons. The standing waves simultaneously compress and move the fluid through the heat source, then expand it while moving it in the reverse direction. For best operation, the heat exchange rate between heat source and the gas should be adjusted to provide a delay time of approximately one quarter of an acoustical period, so that on the average, the fluid is heated after the compression has taken place, but before the expansion. While standing wave heat engines have great appeal because of their lack of moving parts, the need for a thermal delay prohibits use of very good heat exchange and subsequent attainment of high efficiencies.

CROSS REFERENCES

Part of this invention was disclosed in Disclosure Document No. 051914, "Traveling Wave Heat Engine", received by the U.S. Patent and Trademark Office on Aug. 23, 1976.

SUMMARY

This invention uses traveling waves to accomplish the compression, expansion, and gas movement through the heat source, instead of the above mentioned standing waves. Because traveling waves are phased differently than standing waves and have their fluid movement timed to occur between the compression and expansion phases, in a traveling wave heat engine no thermal delay need be provided and efficient heat exchange can be used. This allows higher efficiencies to be attained.

It is the object of this invention to provide an improved acoustical heat engine for the efficient transformation of thermal energy into acoustical energy and vice versa.

Another object of this invention is to provide a new source of mechanical and electrical power.

Another object of this invention is to provide an efficient, thermally driven heat pump, with no major moving parts.

And yet another object of this invention is to provide such an acoustical heat engine which uses a regenerator and the Stirling thermodynamic cycle.

DESCRIPTION OF THE PREFERRED EMBODIMENT

Figure 1:
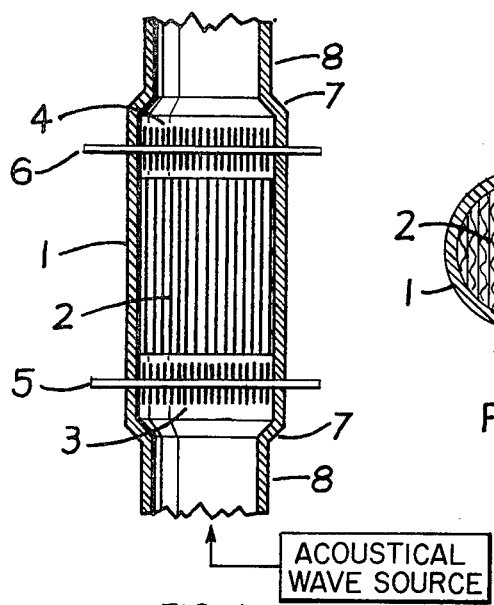
FIG. 1 is a cross sectional view of a simple traveling wave heat engine using a hot and a cold heat exchanger, and a regenerator to produce a spacially fixed temperature gradient.
Figure 2:
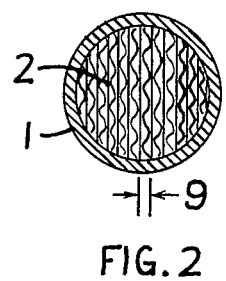
FIG. 2 is another cross sectional view of the heat engine in FIG. 1, showing the end view of the regenerator packing.

FIG. 1 shows the preferred embodiment of a traveling wave heat engine. It consists of a casing (1), a regenerator (2), and two heat exchangers (3) and (4). FIG. 2 shows an end view of the preferred regenerator packing (2), which consists of thin, corrugated stainless steel sheets interleaved with thin, flat stainless steel sheets. Other standard regenerator packing might also work, however best operation might be expected from those packings which have been developed for Stirling engine regenerators. To convert thermal energy into acoustical energy, acoustical traveling waves are made to enter through the bottom of the heat engine, while at the same time the bottom heat exchanger (3) is cooled by passing externally chilled liquid through pipe (5), and the top heat exchanger (4) is heated by passing externally heated liquid through pipe (6). The heated and cooled heat exchangers set up a continuous temperature gradient in the regenerator (2). The regenerator packing is chosen fine enough so that the working fluid in the regenerator is essentially in thermal equilibrium with the packing around it, but not so fine as to prevent the passage of acoustical waves through the regenerator. The upwardly moving traveling waves first pass through the cold heat exchanger (3), are amplified in the regenerator (2), and exit through the hot heat exchanger (4).

Figure 3:
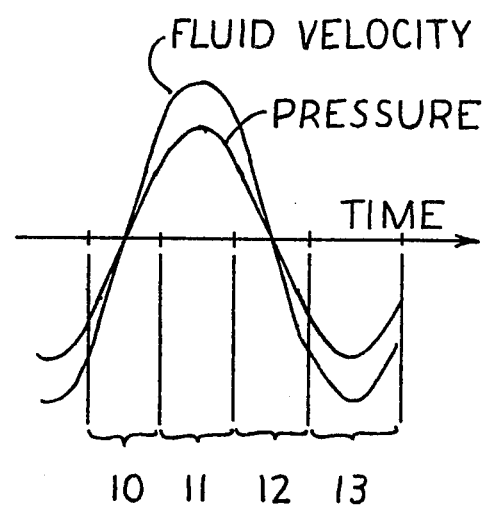
FIG. 3 is a graph of the pressure and velocity versus time for a small fluid volume through which an acoustical traveling wave is passing.

The amplifying ability of the regenerator can be understood by considering the action of a small volume of fluid in the regenerator. If a wave induces the fluid to move up towards the hot end, the fluid is heated by the hotter regenerator packing there and expands; if it induces the fluid to move down towards the cold end, it is cooled and contracts. As acoustical traveling waves pass through any compressible media, the pressure and velocity they impart to a small volume of the media is shown in FIG. 3 as a function of time. As shown, traveling waves are intrinsically phased such that the peak velocity and the peak pressure occur at the same time. The phases that a small volume of the fluid in the regenerator undergoes as the waves travel through it are: first a build up of pressure and compression (10), then a flow of fluid towards the hot end and heating (11), then a drop in pressure and expansion (12), and finally a flow of fluid towards the cool end and cooling (13). This is the basic thermodynamic cycle of a Stirling engine and results in conversion of thermal energy into mechanical energy. In the case of a conventional Stirling engine, pistons are responsible for compression, expansion, and movement of the fluid, and the resulting energy is transferred to these pistons. In the case at hand, traveling waves cause the compression, expansion, and fluid movement and the energy goes into adding to the pressure and the momentum of these waves, thereby amplifying them. Another way to view this process is that in traveling from cold to hot, the traveling waves move the fluid particles in the compression parts of the waves upwards, heating them and increasing the pressure in these parts. Those in the rarefied parts of the waves are moved downwards and cooled, reducing the pressure in these places. Thus the pressurized and rarefied parts of the waves are further pressurized and rarefied, making the waves more intense. Note that it is not necessary for any single fluid particle to traverse the whole length of the regenerator, only that the waves cause it to move, even slightly, relative to the regenerator and thus cause it to be heated and cooled.

For best operation, the regenerator packing should be fine enough so that any thermal delay is less than one quarter of the period of the traveling wave. At the same time, too fine of packing or too long a regenerator can result in excessive acoustical attenuation. For an air filled, one atmosphere pressure device of the type shown in FIGS. 1 and 2 amplifying 10 Hz waves, the regenerator spacing (9) could be about 1 mm. In such case it is important to maintain at least a 1° C/mm temperature gradient along the regenerator so that the acoustical gain is greater than the attenuation due to the viscous losses.

Also, it is important that the acoustical reflections be minimized. This can be accomplished by tailoring the dimensions of the enclosing pipe and various parts to keep the characteristic impedance constant constant along the length of the engine, analogous to that which is done in microwave components and circuits. FIG. 1 shows an increase in the diameter of the engine casing (1) over that of the connecting pipes (8) which compensates for the presence of the heat exchangers, the regenerator, and the temperature gradient inside the engine. Alternately, an adjustable iris or projection might be used to null out reflections caused by these components, by creating oppositely phased reflections which destructively interfere with the first reflections.

As drawn, the device is vertical with the hot end at the top so that the hot fluid floats on top of the cold fluid and so that convection, which would waste energy, does not occur. Membranes or flexible baffles which would allow the passage of sound, but not of steady fluid flow, might also be used to prevent convection, independent of the device orientation. Obviously, these engines should be well insulated to prevent thermal conduction losses.

As with many other heat engines, the traveling wave heat engine can be driven in reverse and be used as a heat pump, to convert acoustical energy into thermal energy. In this case, the traveling waves are made to go from hot to cold through the stationary gradient, so that the wave induced fluid velocity is in the opposite direction as before and the thermal cycle is now: compression, cooling, expansion, and heating. This results in the attenuation of the sound waves and building up of the thermal gradient.

For example, the device in FIG. 1 could be used to produce cold, for refrigeration, air conditioning, etc., by moving the acoustical wave source to the top of the heat engine and making the traveling waves propagate downwards through the device while ambient temperature coolant is passed through the top heat exchanger pipe (6) to remove the heat pumped there. The traveling waves going through the regenerator will automatically pump heat from the bottom end of the regenerator up to the top end. The cold generated at the bottom of the regenerator can be extracted by passing coolant through pipe (5) which will be chilled inside the heat exchanger (3). This chilled coolant can then be used as desired. Conversely, if ambient temperature coolant is passed through pipe (5), heat will be pumped to and concentrated at the top of the regenerator and could be extracted through pipe (6) for use elsewhere.

Note that in the above discussion, the waves pump the heat in a direction opposite to their propagation. Actually, these waves determine the direction and, also, the rate of heat flow through the device. Note, that even in the case of the traveling wave heat engine (acting as a heat engine rather than a heat pump) the heat flow direction is still opposite the wave propagation direction. This action is analogous to that occurring in a positive displacement water pump: the pump's rotational speed and direction determine the rate and direction of the water flow through it. In the case of the pump, the pressure of the water on the input as compared with that on the output determines whether the pump "pumps" the water or the water "drives" the pump. Similarly, in the case of the present invention, the temperature of the thermal input as compared with the output determines the direction of energy transformation between acoustical and thermal forms. If the input is hotter than the output (as it is in the case of a traveling wave heat engine), the "thermal potential" "drives" or amplifies the waves. On the other hand, if the input is colder than the output (as it is in this device used as a heat pump), the "reverse thermal potential" "bucks" or attenuates the waves and draws energy from them, as is necessary for pumping heat.

ALTERNATIVE CONSTRUCTIONS

The device as outlined in the claims requires means to add and to extract thermal energy from regions containing the fluid, a stationary object which causes the temperature gradient between the regions to be stationary, and a means for causing traveling waves to propagate through the device along the desired path through the device. In the preferred embodiment described above, the heat exchangers (3) and (4) comprise the means to add and extract thermal energy, the regenerator (2) comprises the stationary object, and the casing (1) and connecting pipes (8) comprise the means for directing the wave propagation. There are many ways, using conventional devices, in which one can depart from the preferred embodiment: in the means for adding and removing heat, in the object for making the temperature gradient stationary, and in the means for directing the acoustical traveling waves. I shall mention a few of these alternatives here for the sake of illustrating the possible diversity.

Figure 4:
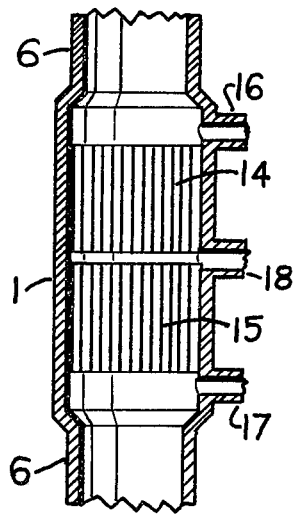
FIG. 4 is a cross sectional view of a variant of FIG. 1, using hot and cold fluid flows to add and extract heat to and from the engine.

FIG. 4 shows one end (14) of the regenerator being heated by a flow of hot fluid and the other end (15) being cooled by a flow of cool fluid directly over the surfaces of the regenerator. These steady flows are superimposed on the wave induced fluid motion. The hot fluid enters through port (16), while the cold fluid enters through port (17). These flows pass through the ends of the regenerator, mix in the center, and are exhausted out port (18). The input ports (16) and (17) and the exhaust port (18) could be tuned to reduce the loss of acoustical power, escaping out the ports. To use this unit as a heat pump, one would reverse both steady flows of fluid and use the top port (16) to extract the cold produced by the heat pumping action of the traveling waves, while using port (17) to exhaust the waste heat.

Figure 5:
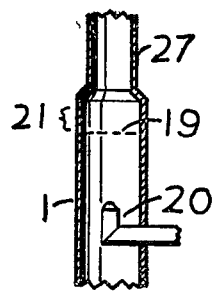
FIG. 5 is a cross sectional view of a variant of FIG. 1, using combustion of fuel and a flame holding screen to set up a stationary temperature gradient.

FIG. 5 shows the temperature gradient set up by a burning zone of fuel and air (21) which is spacially fixed by a screen type flame holder (19). A steady flow of the air-fuel mixture is superimposed on the motion of the traveling wave, to keep the burning zone supplied with energy, as well as cooling the bottom side of the flame screen. Note that in this embodiment, the rate of heat transfer is not temporally uniform as in the other embodiments discussed, but varies in time due to the action of the waves in modulating the flow of air and fuel to the burning zone.

Another possible method for adding heat would be to inject steam or hot water (or any second type of heated fluid) into the hot end of an air filled regenerator (this could also be filled with some other gas) like the type in FIG. 4, and allow the steam or water vapor to condense on and cover the regenerator surfaces. Since the heat of vaporization would be involved in the thermodynamic cycle and this is larger than the normal heat capacity of plain air, such engine might have a higher specific power output than a purely air filled engine.

U.S. Pat. Nos. 2,549,464 and 2,836,033 show acoustical heat engines which are similar to the present invention with the exception that they operate on standing waves instead of traveling waves. In these engines, heat exchangers (and in a few cases, a flame holding screen) serve the dual role of transferring heat and spacially fixing the temperature gradient. In U.S. Pat. No. 2,549,464 the fixing is accomplished by a steady flow of air superimposed on the wave induced air motion, similar to that in the device of FIG. 5 of the present invention. This type of arrangement "sweeps" the temperature gradient up next to the heat exchanger and thus fixes the gradient's location. In U.S. Pat. No. 2,836,033 the fixing is accomplished by locating the hot and cold heat exchangers extremely close to each other, so that the temperature gradient, which must be between them, can move very little, and any substantial fluid motion will cause the required heating or cooling of the fluid. All these methods, both of transferring heat and of fixing the temperature gradient, could easily be used in the present invention. In fact, FIG. 5 uses some of them.

The present invention, as well as the patents referred to above, use pipes to guide and direct the acoustical waves. Alternately, one could use acoustical mirrors, lenses, or other similar devices to focus or define the path of the waves. One might also use an acoustical wave guide which is made of fluid of a different characteristic impedance than that of the surrounding material, analogous to an optical fiber or dielectric wave guide.

APPLICATIONS

Figures 6, 7:
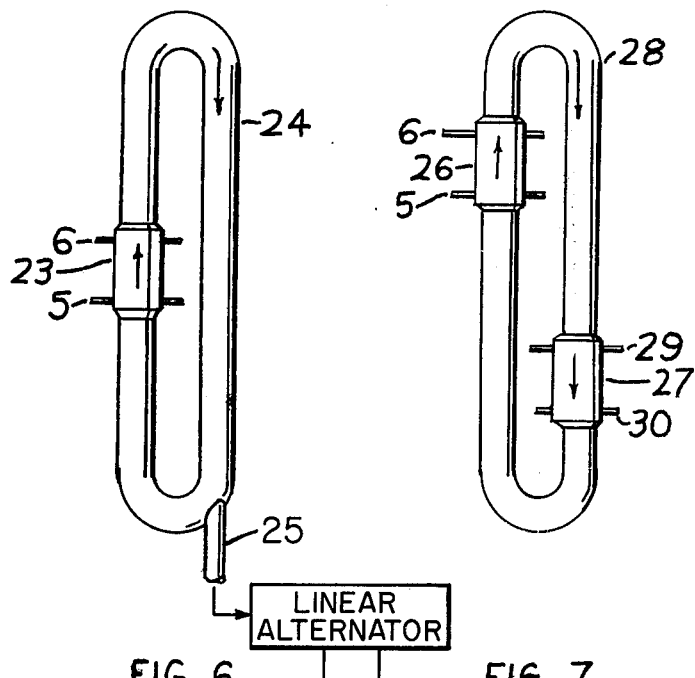
FIG. 6 is a side view of an acoustical oscillator, using the device of FIG. 1 as the gain element.
FIG. 7 is a side view of a thermally driven heat pump, using two of the devices of FIG. 1.

The acoustical amplifiers and heat pumps of FIGS. 1, 2, 4, and 5 could be used as general purpose amplifiers and heat pumps in acoustical circuits. FIGS. 6 and 7 are two possible circuits. There could obviously be many analogies drawn between such acoustical circuits and microwave electronic circuits. For instance, the characteristic impedance of the acoustical circuits and components could be tailored much the same as it is in microwave circuits: by controlling the dimensions and properties of the wave guiding channels and media. As in the microwave case, part of an acoustical circuit could consist of lumped-parameter transmission lines or transformers, which might consist of a series of free pistons or a series of masses and springs. Likewise resonant transformers might be used to match impedances of select frequencies, analogous to their use in microwave circuits.

For some applications, it may be desirable to send the same traveling wave more than once through the device in order to increase the energy transfer between the thermal and acoustical forms. FIG. 6 shows one such application, where the traveling wave, after having propagated once through the traveling wave heat engine (23) (which in this case is meant to be the same as that shown in FIG. 1) is returned to the input again by the sound return pipe (24), which is a simple pipe without any packing. Each time the wave travels from cold to hot through the regenerator, it is further amplified. If the amplitude and phase of the returning wave is correct, the device will self-oscillate, generating its own acoustical traveling wave without any other acoustical input and thus would comprise an acoustical oscillator. This oscillator is analogous to an electrical oscillator where the sound return pipe provides the positive feedback and the regenerator is the gain element. The temperature gradient in the sound return pipe is not spacially fixed, and moves with the wave induced fluid motion, produces no instantaneous heating or cooling of the fluid particles, and so has little effect on the intensity of the wave.

The sound produced by this acoustical oscillator would mostly consist of a wavelength equal to the distance around the acoustical circuit, although other harmonics might also be present. An acoustical filter could be placed in the circuit to define and control the frequency more exactly. A relief valve or flap might be used to control the amplitude of the sound produced.

The output pipe (25) is used to extract acoustical power for outside use. The sound coming out could be used directly as a foghorn, perhaps by simply adding a flare to the pipe's end, as is done to the pipe end in FIG. 1 of U.S. Pat. No. 2,836,033. It could also be used as a source of pressure fluctuations to drive a piston, a pump, or a special type of turbine designed to be driven by fluctuating pressure. A linear alternator as shown in FIG. 6 might be used to convert this fluctuating pressure into electrical power. Alternately, a steady pressure might be produced by passing these sound waves through a one-way valve, such as a Worthington feather valve, or through a set of such valves arranged to imitate an electrical full wave rectifier. The steady pressure produced there might be used directly to drive a conventional turbine or some other type of expansion engine, or be converted to some other form of mechanical or electrical power. Various other ways of converting the acoustical power output into electrical energy are shown in U.S. Pat. Nos. 2,549,464 and 2,836,033. Most of the figures of these patents show the acoustical waves driving diaphragms or bellows which in turn form or are connected to the moving element of a linear, electrical alternator. One of the figures shows the waves driving a piezoelectric element which produces the electricity. Obviously, traveling wave heat engines, such as the acoustical oscillator in FIG. 6 of the present invention could be used, equally well, to supply acoustical energy to these electrical generating devices.

FIG. 7 shows another acoustical circuit utilizing two traveling wave heat engines. Here, one such heat engine (26) is used to produce sound which drives another one (27) in reverse, which can be used to pump heat. The temperature gradient in the heat engine (26) is produced by the application of external heat and cold in the heat exchanger pipes (6) and (5), respectively. The top end of the heat pump regenerator is kept at ambient temperature by the flow of coolant through the heat exchanger pipe there (29), while the bottom end of this regenerator is cooled by the action of the traveling waves pumping heat to the top end. The cold produced at the bottom is extracted by the coolant in the heat exchanger pipe there (30). Alternately, one or more control valves and a bypass sound return pipe might be used to vary the fraction of the acoustical power from the heat engine that is sent through the traveling wave heat pump.

I claim:
1. A heat engine comprising:
   a. a compressible fluid capable of supporting propagation of an acoustical traveling wave,
   b. a means for adding thermal energy to the fluid in one region of space (region A),
   c. a means for extracting thermal energy from the fluid in another region of space (region B),
   d. at least one stationary object in and/or between the two regions, in approximate thermal equilibrium with the fluid there, for the purpose of causing the temperature gradient which can exist in the fluid there to remain essentially stationary in the presence of wave induced fluid motion through the gradient, and
   e. a means for causing an acoustical traveling wave to propagate on a path through the fluid from region B, through the region of stationary temperature gradient, into region A, in such a manner that the wave moves fluid back and forth through the stationary temperature gradient and so causes the fluid there to be heated and/or cooled in conjunction with the compression and expansion of the wave, for the purpose of transforming energy between the thermal form of the temperature gradient and the acoustical form of the traveling wave.

2. The heat engine in claim 1 in which region A is maintained at a higher temperature than region B, such that the traveling wave propagates from cold to hot through the stationary temperature gradient, for the purpose of transforming thermal energy into acoustical energy.

3. The heat engine of claim 2 further characterized by a means for converting the acoustical energy produced by said heat engine into other forms of electrical and mechanical energy.

4. The heat engine of claim 2 further characterized by a means for causing part of the traveling wave to repeat its passage through the stationary temperature gradient in the original direction, this part being of sufficient intensity and proper phase that the acoustical circuit will self-oscillate and produce acoustical power without an acoustical input.

5. The heat engine of claim 1 in which region A is maintained at a lower temperature than that of region B by the heat pumping action of the traveling waves through the stationary temperature gradient, for the purpose of providing a source of heat or cold.

6. The heat engine of claim 1 in which the means for causing the temperature to remain essentially stationary comprises a regenerator.

7. The heat engine of claim 6 in which the means for adding thermal energy and the means for extracting thermal energy comprise flows of hot and cold fluid, respectively, through parts of the regenerator.

* * * * *